United States Patent [19]

Seaberg

[11] Patent Number: 4,471,669
[45] Date of Patent: Sep. 18, 1984

[54] TRACK DRIVE SYSTEM WITH DUAL MODE STEERING

[75] Inventor: David H. Seaberg, Davenport, Iowa

[73] Assignee: J. I. Case Company, Racine, Wis.

[21] Appl. No.: 341,414

[22] Filed: Jan. 21, 1982

[51] Int. Cl.$^3$ .......................... F16H 47/04; F16H 1/42
[52] U.S. Cl. ........................................ 74/687; 74/714; 74/682
[58] Field of Search ................. 74/687, 682, 681, 677, 74/674, 714

[56] References Cited

U.S. PATENT DOCUMENTS

| | | | |
|---|---|---|---|
| 3,492,891 | 2/1970 | Livezey | 74/687 |
| 3,534,635 | 10/1970 | Polak | 74/687 |
| 3,538,790 | 11/1970 | Polak | 74/687 |
| 3,583,256 | 6/1971 | Livezey | 74/687 |
| 3,596,535 | 8/1971 | Polak | 74/687 |

FOREIGN PATENT DOCUMENTS 2517192 4/1975 Fed. Rep. of Germany ........ 74/687

*Primary Examiner*—Allan D. Herrmann
*Assistant Examiner*—D. Wright

*Attorney, Agent, or Firm*—Cullen, Sloman, Cantor, Grauer, Scott & Rutherford

[57] ABSTRACT

A steering system for a tracked machine having dual power paths to opposed planetary differential gear sets for providing conventional differential steering and a second method of steering where the speed of one track is reduced while keeping the other track at its initial speed. The steering system includes primary and secondary drive inputs into the opposed planetary gear sets. The planetary gear sets combine the rotations from the primary and secondary drive inputs in a first steering mode for increasing the speed of one track while reducing the speed of the other track by an equal amount. A second mode of steering is also possible where the speed of one track is reduced while keeping the other track at its initial speed for larger turning radii. The primary drive input includes a variable displacement fluid pump and a variable displacement motor connected to the planetary gear sets by means of a drive shaft for driving the tracks of the machine. The secondary drive input includes a reversible fluid motor connected to a differential gear assembly with opposed drive shafts and steering mode clutches being connected between the differential gear assembly and planetary gear sets for controlling the steering mode.

1 Claim, 1 Drawing Figure

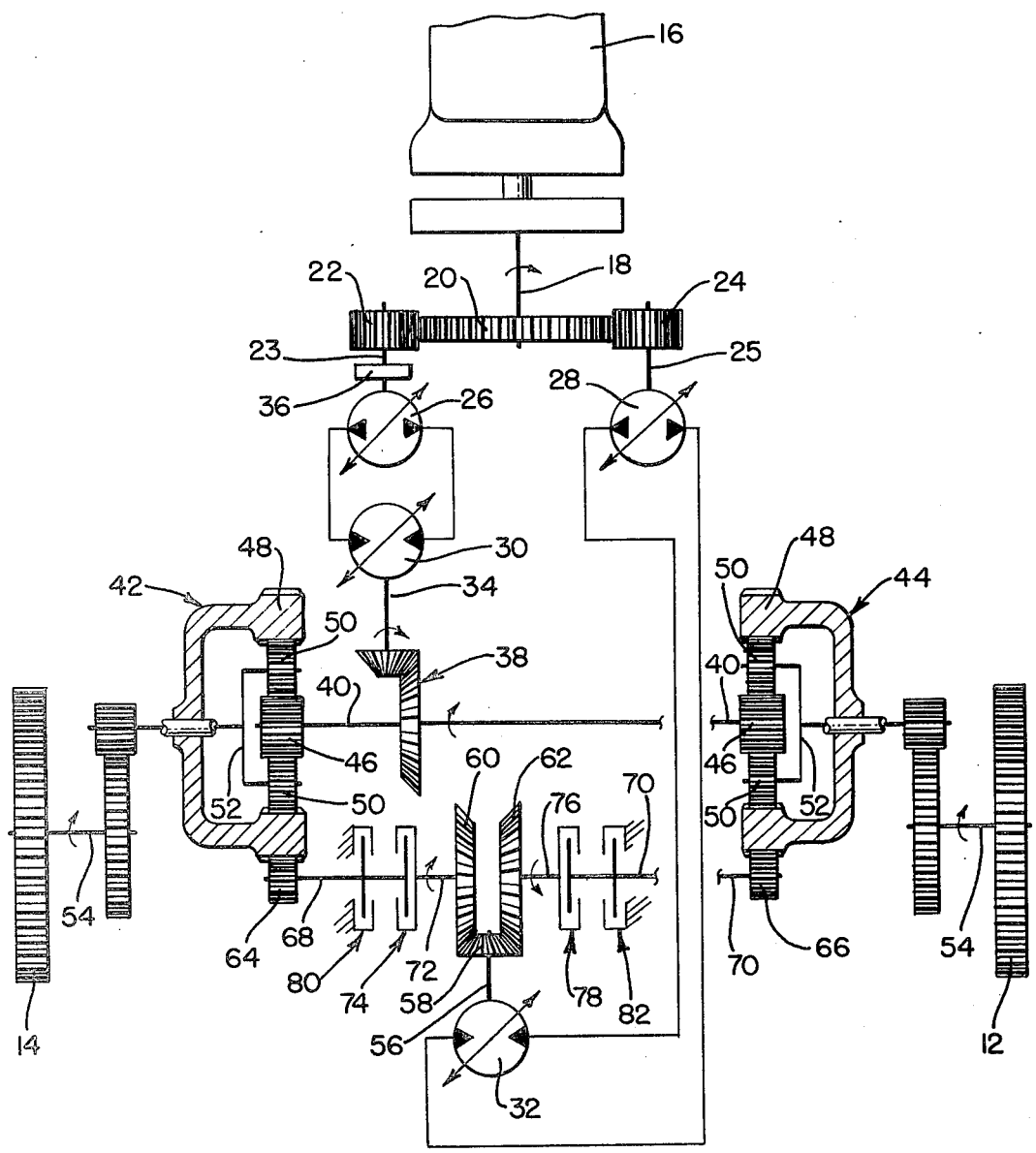

TRACK DRIVE SYSTEM WITH DUAL MODE STEERING

BACKGROUND OF THE INVENTION

The present invention relates to the steering of tracked machines such as crawler tractors which are steered by changing the speed of the track on one side of the machine relative to the track on the other side of the machine.

It is known to provide a machine with a hydrostatic transmission and differential steering where forward and reverse movement of the machine is caused by a primary drive input into opposed planetary differential gears sets and steering is achieved by a secondary drive input into the planetary differential gear sets. The differential gear sets combine the rotations of the primary and secondary inputs during steering for increasing the speed of one track on the machine while reducing the speed of the other track by an equal amount. The size of the hydraulic motors used in a steering system of this type is determined by the minimum turn radius required at a given speed. This normally calls for the use of large motors in order to meet the minimum turn radius requirement. These motors typically run below their rated capacity during periods of machine operation from the minimum turn radius up to straight running with consequential lower efficiency.

Thus, there has been a need for a steering system for tracked machines which is efficient at large turning radii while being capable of providing a small radius of turn as required. It is, therefore, an object of the present invention to provide both normal differential steering and a second method of steering where the speed of one machine track is reduced while keeping the other track at its initial speed for larger turning radii.

SUMMARY OF THE INVENTION

According to the present invention, a steering system for a tracked machine is disclosed having dual power paths to opposed planetary differential gear sets for providing a convential differential steering mode and a second mode of steering where the speed of one track is reduced while keeping the other track at its initial speed.

The steering system includes primary and secondary drive inputs into opposed planetary gear sets which combine the rotations from the primary and secondary drive inputs during steering operations. The primary drive input includes a variable displacement fluid pump and a variable displacement motor connected by means of a drive shaft to the planetary gear sets for driving the tracks of the machine. The secondary drive input includes a variable displacement fluid pump and a reversible fluid motor connected to one of the gears of a three-gear differential unit. A second gear of the differential unit is drivingly connected to one of the planetary gear sets by a pair of drive shafts and a clutch and a brake associated with the drive shafts. Similarly, the third gear of the differential unit is drivingly connected to the other planetary gear set by a pair of drive shafts and a clutch and a brake.

Under normal operation, with no steering effect chosen, the primary drive input drives the planetary gear sets, thereby driving the tracks for straight driving of the machine. The clutches of the secondary drive input are disengaged and the brakes are engaged for holding the ring gears of the planetary gear sets in a stationary position.

Assuming conventional differential steering of the machine is desired, the planetary gear sets combine the primary drive input with the secondary drive input for increasing the speed of one track while reducing the speed of the other track by an equal amount. In this steering mode, the clutches of the secondary drive input are engaged and the brakes are disengaged which causes the ring gears of the planetary gear sets to rotate in opposite directions. This provides a differential movement between the machine tracks such that one track is slowing down relative to the other track which provides steering through differential movement. Left or right steering is provided by driving the reversible motor of the secondary drive input in either forward or reverse.

The present steering system also permits a second mode of steering where the speed of one machine track is reduced while keeping the other track at its initial speed for larger turning radii. Again, as in the first mode of steering, the planetary gear sets combine the rotational movements from the primary and secondary drive inputs. To steer the machine to the right in the second steering mode, the left-hand side of the differential unit is disconnected and allowed to rotate freely while the right-hand side of the differential unit is drivingly connected to its associated planetary gear set to reduce the track speed on the right side of the machine. While the speed of the track on the right side of the machine is being reduced, the left track of the machine is maintained at a speed set by the primary drive input thereby permitting larger turning radii. Steering of the machine to the left involves operating the reversible motor of the secondary drive input and the various clutches opposite of steering to the right.

Other advantages and meritorious features of the steering system of the present invention will be more fully understood from the following description of the preferred embodiment, the appended claims, and the drawing, a brief description of which follows.

BRIEF DESCRIPTION OF DRAWING

The single FIGURE drawing is a schematic illustration of a track drive system with dual mode steering according to the present invention.

DETAILED DESCRIPTION OF THE INVENTION

Referring to the single FIGURE drawing, a crawler tractor 10 is schematically shown only to the extent that is necessary for the understanding of the invention. The tractor is driven in a conventional manner by track chains (not shown) which are driven by driving gears or sprockets 12 and 14. The driving force from sprockets 12 and 14 is derived from a suitable engine 16, such as a diesel or gasoline internal combustion engine, which is connected to drive shaft 18.

A gear 20 on drive shaft 18 meshes with gears 22 and 24 on the drive shafts 23 and 25 of variable displacement pumps 26 and 28 for driving the same. Pump 26 is in circuit with variable speed motor 30 and pump 28 is in circuit with variable speed motor 32 for forming two hydrostatic pump-motor driving circuits. Each variable displacement pump 26 and 28 has a swashplate movable in response to movement of a control lever (not shown) to either side of a zero displacement position to direct fluid in either of two directions to cause either forward or reverse rotation of motors 30 and 32.

The drive shaft 34 from motor 30 is connected through drive clutch 36 to bevel gear assembly 38 for driving transverse input shaft 40. The ends of shaft 40 are operatively associated with identical planetary differential gears sets 42 and 44 with each gear set having three gear elements including a sun gear 46, a ring gear 48, and a set of planet gears 50 on a carrier 52. The input rotary shaft 40 is drivingly connected to the sun gears 46 of the respective differential gear sets 42 and 44. Each planet gear carrier 52 is connected to a respective sprocket 12 or 14 by means of an output shaft 54. Sprockets 12 and 14 are driven depending on the rotational direction and speed of output shafts 54.

The output drive shaft 56 of reversible motor 32 has a bevel gear 58 fixed thereto which is in engagement with bevel gears 60 and 62 so that gears 58, 60 and 62 form a differential unit. Ring gears 48 of differential gear sets 42 and 44 are driven by gears 64 and 66 which are coupled to drive shafts 68 and 70, respectively. Shaft 68 is drivingly connected to drive shaft 72 by selectively operable clutch 74 and shaft 70 is drivingly connected to drive shaft 76 by selectively operable clutch 78. Drive shafts 72 and 76 are, in turn, connected to bevel gears 60 and 62 for transmitting the rotational driving force of motor 32 to shafts 68 and 70. Selectively operable brakes 80 and 82 are respectively associated with drive shafts 68 and 70 for grounding or locking the drive shafts to the machine frame during certain steering situations.

Under normal operation, with no steering effect chosen, engine 16 drives pump 26 which, in turn, drives motor 30 to rotate primary drive input shaft 40. Pump 28 is set at zero displacement, clutches 74 and 78 are disengaged, and brakes 80 and 82 are engaged which locks the ring gears 48 of planetary gear sets 42 and 44. Thus, shaft 40 rotates sun gears 46 to rotate the planetary gears 50, thereby driving the track-driving sprockets 12 and 14. This provides straight driving of the machine. It will be understood that reversal of pump 26 drives motor 30 in reverse to drive the track-driving sprockets 12 and 14 in the reverse direction.

Assuming conventional differential steering of the machine is desired, the planetary gear sets 42 and 44 combine the primary drive input from shaft 40 with the secondary drive input from shafts 68 and 70 in a first steering mode for increasing the speed of one track while reducing the speed of the other track by an equal amount. In this steering mode, clutches 74 and 78 are engaged, clutches 80 and 82 are disengaged, and pump 28 is controlled to actuate motor 32 thereby providing a differential movement of shafts 68 and 70 for rotating one in one direction and one in the opposite direction which, in turn, causes ring gears 48 to rotate in opposite directions. This provides a differential movement between track-driving sprockets 12 and 14 such that one sprocket is slowing down relative to the other sprocket which provides steering through differential movement of the tracks. Left or right steering is provided by driving reversible motor 32 in either forward or reverse.

The present invention also permits a second mode of steering where the speed of one machine track is reduced while keeping the other track at its initial speed for larger turning radii. Again, the planetary gear sets 42 and 44 combine the primary drive input from shaft 40 with the secondary drive input from shafts 68 and 70. To steer the machine to the right in the second steering mode, pump 28 is controlled to actuate motor 32, clutch 74 is disengaged to allow free rotation of drive shaft 72, and clutch 80 is engaged to lock drive shaft 68 and the ring gear 48 of planetary gear set 42 to the machine frame. Simultaneously, clutch 78 is engaged and clutch 82 is disengaged for permitting the transmission of driving force from shaft 76 to drive shaft 70 and planetary gear set 44. The motion imparted to planetary gear set 44 by drive shaft 70 reduces the speed of sprocket 12 while keeping the opposite sprocket 14 at the speed set by primary drive input shaft 40, thereby permitting larger turning radii. Steering of the machine to the left involves operating motor 32 and the various clutches opposite of steering to the right as hereinbefore described.

It will be apparent to those skilled in the art that the foregoing disclosure is exemplary in nature rather than limiting, the invention being limited only by the appended claims.

I claim:

1. A track drive and steering system for a machine having a pair of tracks comprising:

drive wheels for driving said tracks, a mechanically powered first drive shaft, said mechanically powered first drive shaft including first gearing mounted thereon for driving two variable displacement hydraulic pumps, each pump connected to a variable speed hydraulic motor whereby said pumps and motors form two separate variable speed hydrostatic drives;

two planetary differential gear sets, each gear set including a sun gear, a ring gear, and a set of planet gears mounted on a carrier, each carrier being drivingly connected to a respective drive wheel by an output shaft, one of said motors being drivingly connected by second gearing to a power input member, said power input member being connected at its opposite ends to the sun gears of said differential gear sets for transmitting a drive input to said drive wheels;

the other motor including a second drive shaft having a first bevel gear fixed thereto which is drivingly connected to second and third bevel gears to form a differential unit, said second bevel gear of said differential unit drivingly connected to the ring gear of one differential gear set by third and fourth drive shafts with said fourth drive shaft having a gear thereon which drivingly engages the ring gear of said one differential gear set, a first selectively operable clutch connecting said third and fourth drive shafts and a first selectively operable brake connected to said fourth drive shaft, said third bevel gear of said differential unit drivingly connected to the ring gear of the other differential gear set by fifth and sixth drive shafts with said sixth drive shaft having a gear thereon which drivingly engages the ring gear of said other differential gear set, a second selectively operable clutch connecting said fifth and sixth drive shafts and a second selectively operable brake connected to said sixth drive shaft;

said first clutch being operable to drivingly connect or disconnect said third and fourth drive shafts and said second clutch being operable to drivingly connect or disconnect said fifth and sixth drive shafts, and said first and second brakes being operable to selectively ground said fourth and sixth drive shafts respectively; and said track drive and steering system being operated in a first steering mode for increasing the speed of one track while reducing the speed of the other track by an equal amount and said track drive and steering system being operated in a second steering mode for reducing the speed of one track while keeping the other track at a speed set by said drive input.

* * * * *